United States Patent [19]

Fisher

[11] 4,254,189

[45] Mar. 3, 1981

[54] DISC HAVING SUBSTRATE, INTERMEDIATE LAYER AND MAGNETICALLY SENSITIVE LAYER WHEREIN INTERMEDIATE LAYER HAS MELTING POINT LESS THAN ANNEALING TEMPERATURE OF SUBSTRATE BUT HIGHER THAN PROCESSING TEMPERATURE OF MAGNETICALLY SENSITIVE LAYER

[75] Inventor: Robert D. Fisher, Cupertino, Calif.

[73] Assignee: Memorex Corporation, Santa Clara, Calif.

[21] Appl. No.: 55,085

[22] Filed: Jul. 5, 1979

[51] Int. Cl.[3] .......................... B05D 1/38; B32B 7/02; B32B 31/20; B32B 31/08

[52] U.S. Cl. .................................... 428/626; 428/432; 428/433; 428/631; 428/434; 428/469; 428/632; 428/472; 428/642; 428/646; 428/649; 428/650; 428/651; 428/656; 428/666; 428/900; 428/928; 428/937; 428/939; 209/192; 427/128; 427/129; 427/130; 427/131; 427/132; 427/327; 427/328; 427/330; 427/374.4; 427/374.7; 427/376.8; 427/405; 427/419.4; 427/421; 427/423; 428/64; 428/428

[58] Field of Search ............... 427/128, 129, 130, 131, 427/132, 327, 328, 330, 405, 421, 423, 376 H; 428/64, 432, 469, 472, 626, 631, 632, 642, 646, 650, 651, 652, 666, 928, 900, 428, 433, 434, 939, 937, 649; 209/192 C

[56] References Cited

U.S. PATENT DOCUMENTS

| | | | |
|---|---|---|---|
| 2,842,458 | 7/1958 | Feeney et al. | 427/327 |
| 3,198,657 | 8/1965 | Kimball et al. | 427/128 |
| 3,291,578 | 12/1966 | Fahey | 428/939 |
| 3,395,444 | 8/1968 | Davis et al. | 427/405 |
| 3,681,225 | 8/1972 | Gemma et al. | 427/129 |
| 3,959,553 | 5/1976 | Hartmann et al. | 427/131 |
| 4,029,541 | 6/1977 | Barlow et al. | 427/131 |
| 4,159,358 | 6/1979 | Hench | 427/330 |

FOREIGN PATENT DOCUMENTS

| | | | |
|---|---|---|---|
| 648878 | 9/1962 | Canada | 427/131 |
| 1933737 | 1/1970 | Fed. Rep. of Germany | 427/131 |
| 1248733 | 10/1971 | United Kingdom | 427/376 H |

*Primary Examiner*—James C. Cannon

[57] ABSTRACT

A structure and method for manufacturing said structure are disclosed for producing a surface of improved smoothness. The result is achieved by applying to the substrate a layer of low melting point metal or low melting point glass and elevating the composite structure to the melting point of said low melting point metal or low melting point glass. The said metal or glass thereupon spreads to a smooth surface of greatly improved roughness.

9 Claims, No Drawings

DISC HAVING SUBSTRATE, INTERMEDIATE LAYER AND MAGNETICALLY SENSITIVE LAYER WHEREIN INTERMEDIATE LAYER HAS MELTING POINT LESS THAN ANNEALING TEMPERATURE OF SUBSTRATE BUT HIGHER THAN PROCESSING TEMPERATURE OF MAGNETICALLY SENSITIVE LAYER

BACKGROUND OF THE INVENTION

1. Field of the Invention

The invention relates to rotating computer disc memories wherein magnetic material is applied to a disc surface and magnetic read/write transducers are brought into close proximity with said surface so that information may be stored and retrieved from the magnetic disc memory. The invention proposes a method whereby the surface roughness of the surface of magnetic rotating discs may be improved and/or manufacturing economies enhanced through the use of a specially defined intermediate layer interposed between the magnetic disc substrate and the layer containing the magnetically sensitive material.

2. Description of the Prior Art

The trend over the last decade for computer applications has been toward a dramatic increase in the need for storage capability. In many of these applications, disc storage has been chosen as the means by which customers keep large amounts of information "on line." Due to the increased usage of disc storage, it is most advantageous from a cost standpoint (cost to the manufacturer as well as cost to the ultimate user) to store as much information as possible within a given area of magnetic discs. Thus, the density of magnetically recorded information has rapidly increased in recent years, such density increases often going hand in hand with magnetic read/write transducers operating closer to the magnetic media. The end result of this perceived technological trend has been a requirement that magnetic storage discs as used in computer rotating memories be smoother so that air-bearing read/write transducers can fly closer to the media during their magnetic recording and reading operations as well as starting and stopping in contact with said magnetic recording media.

The trends in the development of magnetic recording discs have proceeded along two distinct lines:

(1) Particulate discs in which the magnetic recording media consists of finely dispersed magnetically sensitive particles suspended in a polymeric binder applied directly to the substrate which has been composed most often of an aluminum alloy, and (2) Thin film discs in which the magnetic recording media is a thin continuous film applied directly to the substrate which has often been composed of an aluminum alloy but glass and other materials have been utilized. In the case of particulate discs, it has often been the practice to coat the aluminum substrates by a process known as spin coating not unlike that taught in U.S. Pat. No. 3,198,657 to Kimball, et al. The finely dispersed magnetically-sensitive particles are applied within liquid resin which is carefully controlled in viscosity to create a more or less uniform layer once cured. However, the as-cured disc (that is, with the resin cross-linked at an elevated temperature and all solvents evaporated) is not smooth enough or thin enough to properly permit magnetic recording. The cured disc must subsequently be polished and/or burnished to obtain an ultimately smooth surface for magnetic recording. While the polymeric binder suspending the magnetic particles above the substrate is somewhat forgiving of defects and irregularities in the substrate finish, it is a practical reality that even after polishing and/or burnishing of the particulate disc coating, substrate defects are reflected in the ultimate surface topography of the particulate disc. Thus, while the processing operations attendant to the polishing of particulate media have a significant bearing on the ultimate surface finish, the substrate roughness cannot be overlooked as a prime contributor to the ultimate smoothness of any finished magnetic recording disc.

In the case of thin film media, the need for highly smooth, defect-free substrates for the application of thin magnetic films is greatly augmented over the case of particulate discs. As the thickness of thin magnetic films can be less than five microinches (⅛th micron) and as the processing techniques used for the application of thin magnetic films tend to exactly replicate the base structure, thin magnetic film discs are totally unforgiving of surface topographic irregularities. It is known in the prior art that metallic substrates (e.g., aluminum) of magnetic discs can be finished to an excellent surface finish by a variety of mechanical techniques. Such techniques include (1) lapping, and (2) turning of the substrates using a diamond tool bit. As a further processing refinement, aluminum substrates have been lathe-turned in the prior art using a diamond tool bit where the spindle supporting the disc substrate was of an air bearing type. While such refinements do indeed make smoother substrates, the cost of processing can be prohibitive.

Another method for improving the surface of the substrate is to coat the substrate with a layer of a suitable material which can be more easily and thus less expensively rendered smoother than the base metallic substrate. U.S. Pat. No. 3,523,824 to Powers, et al. teaches the application of a thin layer of plastic upon the metal substrate so as to provide a layer that is smooth and insulating. While it is clear from Powers, et al. that the importance of substrate smoothness is paramount, Powers, et al. is directed toward solving an underlying problem which is seen as "the formation of effective metal-to-plastic bonding sites in a significant concentration upon the surface of an ultra-smooth plastic substrate without impairing the smoothness of the substrate surface." Powers, et al. does not explain any particular process or method for achieving an ultra-smooth surface upon the intermediate plastic layer and does not define any physical constraints upon the subject intermediate layer. U.S. Pat. No. 4,046,932 to Hartmann, et al. describes an improved magnetic recording disc. Hartmann, et al. again recognizes the need for extremely smooth substrates and, in fact, suggests that an intermediate layer of coating resin may be used to enhance the effective surface smoothness of the substrate. However, the method and processes that might be used to achieve and enhance surface smoothness of the intermediate layer are not discussed.

U.S. Pat. No. 3,959,553 to Hartmann, et al. specifically deals with an improved magnetic recording disc of enhanced surface smoothness by utilizing an intermediate layer composed of a resin binder containing hard, non-magnetic pigment with a Mohs' hardness of at least seven (7). By loading the polymeric or resin binder with extremely hard particles, the intermediate layer obtains mechanical properties of enhanced hardness allowing grinding and polishing of the surface of the baked intermediate layer to achieve the desired slight surface roughness. The additional processing steps of baking and grinding and/or polishing of the intermediate layer are requirements to practice their invention.

SUMMARY OF THE INVENTION

The invention proposes employing an intermediate layer between the disc substrate and magnetic coating (be it particulate or thin film) such that the intermediate coating fills in and otherwise masks topographic defects in the substrate so that the topmost surface of the intermediate coating is significantly smoother in the end than the substrate to which it was originally applied. The advantages of the invention are that mechanical polishing and/or burnishing of the substrate are eliminated through the flowing of the intermediate layer over the disc substrate which may be of any suitable material (many materials have been used as disc substrates including aluminum alloys, titanium, magnesium, brass, bronze and glass). Moreover, even if polishing of the intermediate layer were required to achieve a certain final smoothness, an advantage of the invention is that less of such polishing would be required. In addition, the invention also permits the use of rougher substrates than would otherwise have been permitted without the inclusion of the intermediate layer applied and processed as hereinbelow set forth. The invention proposes two distinct classes of materials out of which the intermediate layer might be composed: low melting point metals and low melting point glasses. Whether one employs a low melting point metal or a low melting point glass, the requirements of said intermediate layer are that:

(1) said intermediate layer chemically "wet" the aluminum substrate (i.e., spread), (2) the melting temperature of said intermediate layer must be lower than the annealing temperature of the substrate material, and (3) the melting temperature of said intermediate layer must be higher than the processing temperatures to be encountered later during the subsequent application of the magnetic film.

For particulate media, the temperature restraint amounts to a specification that the intermediate layer have a melting point less than the annealing temperature for aluminum but higher than the crosslinking and curing temperature of the polymeric resin. For thin film media, the temperature specification amounts to a requirement that the intermediate layer have a melting temperature less than the annealing temperature of the aluminum but greater than the subsequent processing temperature encountered in applying thin film materials. While these physical constraints limit the materials which might be employed in the proposed intermediate layer, there are certain classes and categories of materials which can be successfully used to form the proposed intermediate layer.

It is the object of the invention to provide a process whereby greatly enhanced surface finishes may be achieved for magnetic disc substrates.

It is another object of the invention to provide a process whereby low cost and easily manufactured substrates of enhanced surface smoothness may be achieved.

It is further an object of the invention to provide processing techniques and suggested structures for use in enhancing the surface finish of both particulate media and thin film media as may be employed in rotating disc computer memories.

PREFERRED EMBODIMENTS

There are three basic physical constraints upon the choice of a material to be used as an intermediate layer for the improvement of the substrate surface roughness of a rotating memory magnetic recording disc. These three requirements are:

(1) that the surface energy of the metallic substrate/air interface be less than the surface energy of the intermediate layer/air interface. This is no more than the statement that it be energetically favorable for the intermediate layer to "wet" or "spread" over the metallic substrate. Without this requirement upon the intermediate layer, no spreading or wetting of the metallic substrate is possible; the intermediate layer will not flow, (2) that the melting point or solid/liquid transition temperature for the intermediate layer be less than the annealing temperature of the metallic substrate, and, (3) that the melting point or solid/liquid transition temperature for the intermediate layer be greater than subsequent processing temperatures that will be experienced in the application of the topmost magnetic film layer.

Insofar as the surface energy requirement (1) is concerned, many materials will satisfy the properties demanded. However, if a material is desired for use as the intermediate layer which violates the surface energy requirement, a "flash" or mono-molecular layer of another material may be applied to the substrate to enhance wetting or adhesion. For example, an extremely thin layer of chromium or titanium might be R. F. Sputtered or electron beam evaporated onto the disc surface to increase the aluminum substrate/air interface surface energy. This would then enhance the spreading of lower surface energy glasses or metals as the primary intermediate layer.

Insofar as the melting point considerations are concerned, aluminum typically in rotating disc substrates exhibits the property of annealing at approximately 340° C. In the case of particulate discs, crosslinking of the resin material and/or hardening of the magnetic oxide layer requires temperatures of approximately 220°-230° C. The following materials are suggested as suitable for use as an intermediate layer in this invention:

| Material | Melting Point - Degrees C. |
|---|---|
| Bismuth | 271 |
| Tin | 231 |
| 95% tin/5% silver | 245 |
| 80% cadmium/20% zinc | 270 |
| 95% tin/5% antimony | 240 |
| Paralyne (organic polymer) | 300 |
| Glasses: | |
| Fluoroberyllates | * |
| Fluoroborates | * |
| Phosphates | * |
| Vanadates | * |
| Tellurites | * |
| Borosilicates | * |

*Varies with composition.

The above list of materials as suitable for the intermediate layer is not intended to be exhaustive but merely representative of materials which are suitable for the application. It is within the concept of this invention that other materials may be used to practice the invention insofar as the physical constraints are satisfied.

There are a variety of techniques for applying the intermediate layer to the metallic substrate. Such techniques are clearly dependent upon the materials being employed. In one embodiment, the intermediate layer could be applied in the form of a powder. After application of the powder, the disc is slowly rotated while being heated to achieve the melting point of the intermediate layer. The temperature is maintained upon the rotating disc until the intermediate layer has had sufficient time to spread and stabilize into a smooth glass-like surface. The disc is then slowly cooled to room temperature. In an alternate embodiment, it is possible to sputter the intermediate layer onto the disc substrate by R. F. Sputtering or thin film deposition techniques. Thin film deposition techniques in general result in coatings which perfectly replicate the base structure. Once a thickness equal to or exceeding the mean surface roughness of the metallic substrate has been sputtered onto said substrate, the disc is elevated in temperature to the melting point of the intermediate layer while being slowly rotated. Again the disc is maintained at the elevated temperature until the intermediate layer has had sufficient time to flow and form a glass-like surface. The disc is then lowered in temperature slowly to room conditions.

With respect to the surface energy requirement discussed above, in an alternative embodiment of the invention a thin layer of another material may be applied directly to the aluminum substrate to enhance adhesion and wetting of the intermediate layer. For example, a layer of chromium or titanium may be R. F. Sputtered onto the aluminum substrate to a thickness of, say, five (5) microinches to improve adhesion and wetting of a glass intermediate layer. The only requirement is to completely cool the substrate with at least one molecular layer of said chromium or titanium material. The chromium or titanium layer will not flow at the elevated temperature at which the glass would melt, and although the chromium or titanium merely replicates the aluminum topography, it raises the surface energy of the solid/vapor interface, thereby permitting more complete wetting and spreading of the intermediate layer when melted.

I claim:

1. A structure with improved surface smoothness comprising a substrate, a magnetically sensitive coating, and an intermediate layer interposed between said substrate and said magnetically sensitive coating wherein
   the material of said intermediate layer has the properties of spreading over said substrate material when said intermediate layer is elevated to its melting point,
   the material of said intermediate layer has the property of melting at a temperature less than the annealing temperature of said substrate material, and
   the material of said intermediate layer has the property of melting at a temperature greater than the subsequent processing temperatures for application and/or curing of said magnetically sensitive layer.

2. The structure of claim 1 wherein said intermediate layer is a low melting point glass.

3. The structure of claim 1 wherein said intermediate layer is a low melting point metal.

4. The structure of claim 1 including a thin layer of material applied directly upon said structure wherein said thin layer enhances adhesion between said intermediate layer and said substrate.

5. The structure of claim 4 wherein said thin layer is chromium.

6. The structure of claim 4 wherein said thin layer is titanium.

7. The method of manufacturing a structure of improved surface smoothness comprising the steps of:
   (a) providing a substrate material,
   (b) applying a thin layer of chromium to said substrate,
   (c) applying a filler material to said chromium layer, said filler material having a melting point less than the "annealing" or "melting" point of said substrate, and said chromium layer enhancing the adhesion between said filler material and said substrate,
   (d) elevating the temperature of said substrate and said filler material to the melting point of said filler material,
   (e) maintaining said substrate and said filler material at said melting point temperature of said filler material until said filler material spreads to a glass-like smoothness, and
   (f) cooling of said structure.

8. The method of manufacturing a structure of improved surface smoothness comprising the steps of:
   (a) providing a substrate material,
   (b) applying a thin layer of titanium to said substrate,
   (c) applying a filler material to said titanium layer, said filler material having a melting point less than the "annealing" or "melting" point of said substrate, and said titanium layer enhancing the adhesion between said filler material and said substrate,
   (d) elevating the temperature of said substrate and said filler material to the melting point of said filler material,
   (e) maintaining said substrate and said filler material at said melting point temperature of said filler material until said filler material spreads to a glass-like smoothness, and
   (f) cooling of said structure.

9. The method of claims 7 or 8 including a layer of magnetic material applied to said filler material wherein said magnetic material is capable of storing information in the form of magnetic flux variations.

* * * * *